March 14, 1939.  J. W. SADLER ET AL  2,150,751
CREAM COOLER
Filed Sept. 10, 1936   2 Sheets-Sheet 1

Inventors
John W. Sadler,
and Grover A. Blunt,
By Z. T. Wolensmith
Attorney.

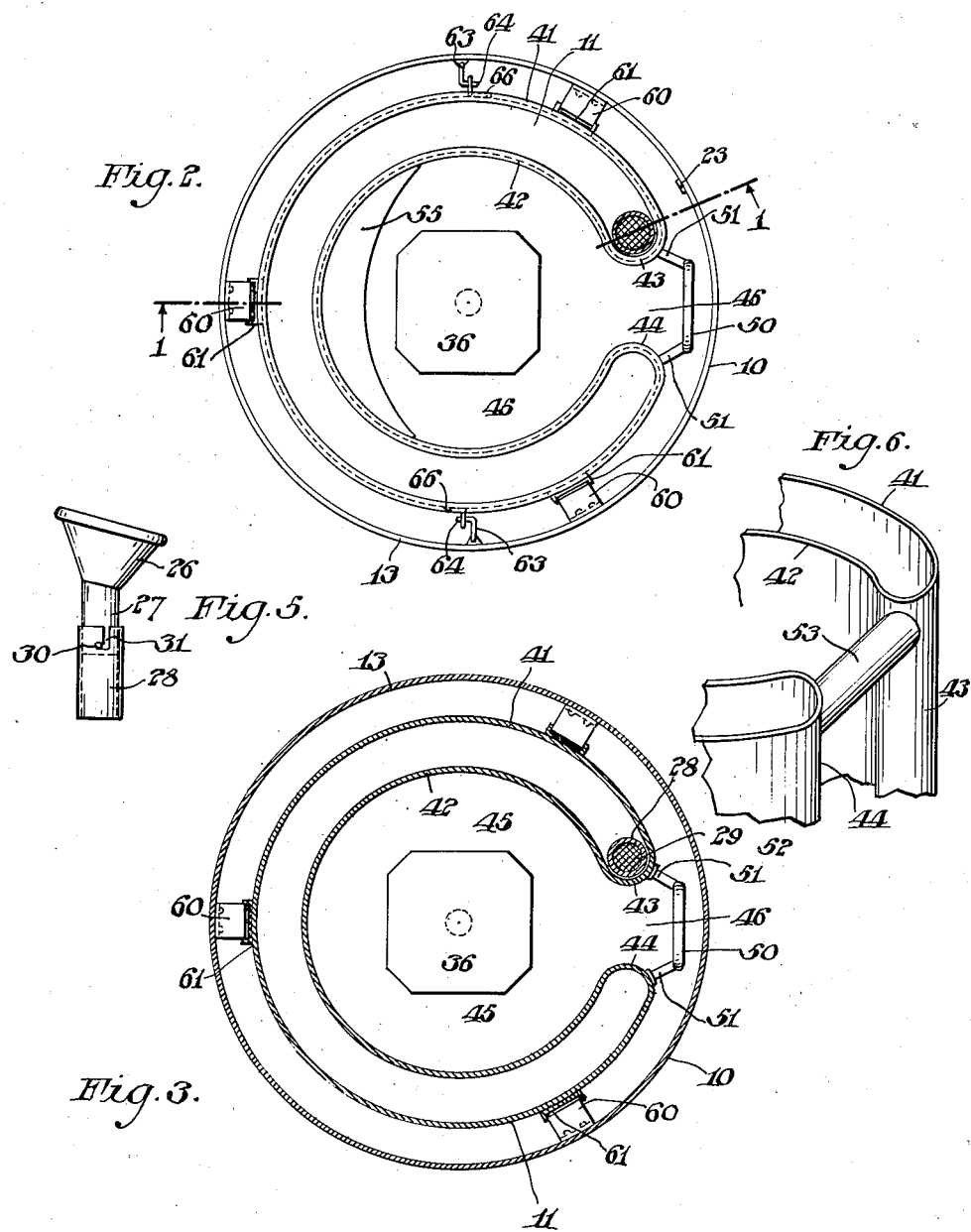

Patented Mar. 14, 1939

2,150,751

UNITED STATES PATENT OFFICE 2,150,751

CREAM COOLER

John W. Sadler, Upper Darby, Pa., and Grover A. Blunt, Cedar Rapids, Iowa

Application September 10, 1936, Serial No. 100,128

4 Claims. (Cl. 257—195)

This invention relates to cream coolers, and more particularly to apparatus for cooling cream after the same has been separated from milk.

In order that the milk from the cows of a herd may be utilized in the most effective manner for different purposes it is necessary to separate the cream from the same. This fluid is at the animal body temperature of approximately 98° F. The time taken for milking, which may amount to an hour or more, does not, in the range of temperatures ordinarily encountered, have an appreciable effect on the cooling, and temperature drops of about 2° F. are all that ordinarily occur.

After the milking operation, the cream is usually separated from the milk in one of the various types of cream separators, preferably mechanical, which are well known in the art. This separating operation usually takes approximately half an hour to accomplish. During this period of time the temperature drop and elimination of the animal heat of the milk is very small, dependent only on the external temperatures, the fall in temperature usually does not run more than a few degrees Fahrenheit.

It has been found that after the cream has been thus separated from the milk, in order to make first class butter, the separated cream must be cooled as quickly as possible. While it is possible to cool the separated cream in cans, the inside portion constituting the main body of the cream may become tainted, while the outside portion only is cooled to the temperature desired, during the time required for cooling with the cans and other apparatus now in use.

One expedient which has heretofore been resorted to in an effort to cool cream properly is the use of small cans which are known as "shot gun cans". These cans are cylindrical and of relatively small diameter, which diameter is usually not over 10 inches. Cans of this type are placed in the cooling water and the contents of the can are stirred in order to induce a circulation within the interior of the can. It has been found, however, that approximately twelve hours are required to cool cream in this manner.

With structure of the type just referred to, as well as with other types which have heretofore been available, numerous difficulties are encountered. For example, the body of the cream may contain portions which are cold, and larger portions which are warm and of a temperature which permits the growth of bacteria and the formation of acid. The cream, because of the larger portions of warm cream, frequently becomes sour before it has been adequately cooled.

Another difficulty which arises when several hours are required for cooling is the setting of solids from the cream on the side of the can. This setting not only interferes with proper cooling but renders the handling of the cream more difficult and increases the burden of cleaning. In addition, dilution with water to remove these solids must be resorted to. Such water dilution spoils the flavor of butter made from the cream and the butter made therefrom can only be kept for short periods of time without spoilage setting in.

Another difficulty likewise arises with the apparatus heretofore available for cooling cream after separation. With such apparatus there is nothing to prevent or discourage the mixing of warm and cold cream with resultant objections and disadvantages which are well known in this field. It may be stated in this connection, that in cold cream the bacteria present and available for development, are rapidly increased in the presence of or upon the admixture of warm cream. The butter which is made therefrom has a strong and unpleasant flavor, and is not suitable for refrigeration for shipping to more distant points.

Other difficulties likewise arise because much of the apparatus which is now available is not easy to clean nor to keep clean and uncontaminated.

It is accordingly an object of the present invention to provide a cream cooler which will overcome the difficulties heretofore encountered but which will at the same time be simple and sturdy in construction.

It is also an object of the present invention to provide an improved cooler for separated cream which will operate in a rapid and effective manner.

It is a further object of the present invention to provide a cream cooler which is particularly adaptable for exceedingly rapid cooling of the cream so that, as the cream is separated mechanically, the same will be cooled to the desired temperature and upon completion of the separation the cream will be substantially cooled to the desired extent.

It is a further object of the present invention to provide a cream cooler in which the cream receiving can may be easily handled by the user for assembly, for transferring the cooled cream and for washing.

It is a further object of the present invention to provide a cream cooler which may be quickly and easily sterilized, so that the same will comply with the sanitary requirements of milk inspectors throughout the country.

Other objects of the invention will appear from the annexed specification and claims.

The nature and characteristic features of the invention will be more readily understood from the following description, taken in connection with the accompanying drawings forming part hereof, in which:

Fig. 2 is a horizontal plan view with the top cover removed to show the internal construction;

Fig. 3 is a horizontal sectional view taken approximately on the line 3—3 of Fig. 1;

Fig. 5 is a view in elevation illustrating certain details of a funnel and strainer forming part of the device; and Fig. 6 is a fragmentary perspective view showing a modified form of construction of the cooling can which may be employed.

Figure 1:
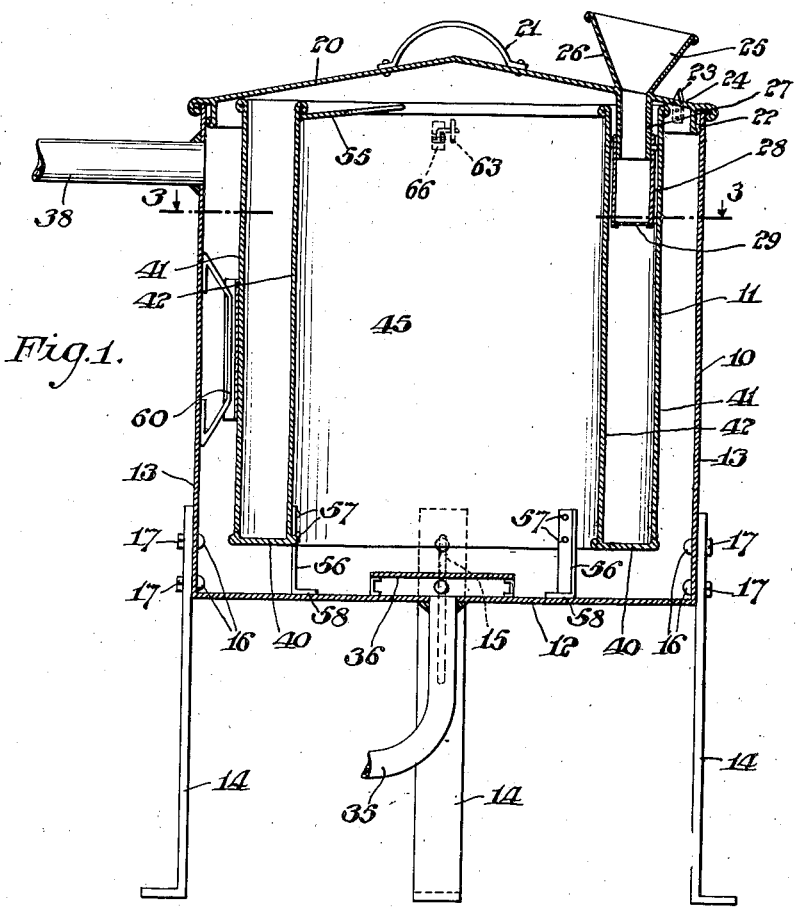
Fig. 1 is a vertical sectional view of a preferred embodiment of the present invention taken approximately on the line 1—1 of Fig. 2.
Figure 4:
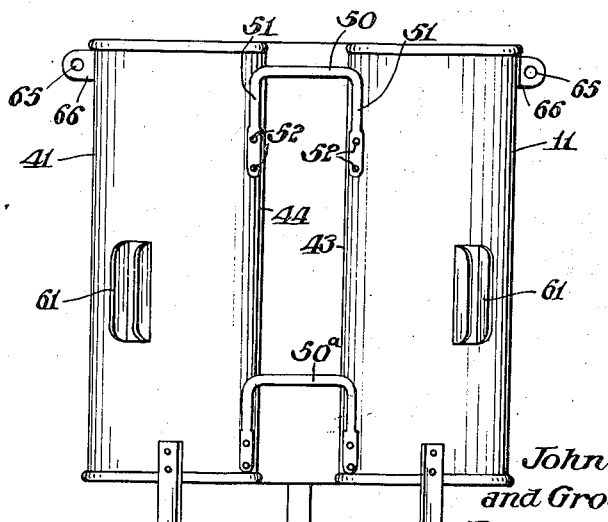
Fig. 4 is a side elevational view of a cream cooling can forming part of the present invention.

It will, of course, be understood that the description and drawings herein contained are illustrative merely, and that various modifications and changes may be made in the structure disclosed without departing from the spirit of our invention.

Referring more particularly to the drawings in which a preferred embodiment of the invention is illustrated, the cream cooler of the present invention preferably includes an outer cylindrical water container or casing 10, and an inner cream receiving and cooling receptacle 11 removably mounted with the water container 10.

The water container 10 is preferably constructed of sheet metal with a bottom wall 12, and an upwardly extending circular side wall 13. The water container 10 may be supported in any preferred manner, at a convenient height with respect to a mechanical cream separator (not shown) and legs 14, having vertical slots 15 through which bolts 16 extend, have been found suitable for this purpose. Nuts 17, mounted on the bolts 16, permit of the proper adjustment of the height of the water container 10.

A removable flat conical cover 20, of sheet metal, is provided for the top of the water container 10, and a handle 21 is secured thereto. A downwardly extending flange 22 for strengthening and stiffening the cover may be employed on the under side thereof.

The upper portion of the inner face of the wall 13 of the water container 10 preferably has one or more lugs 23 mounted thereon which extend through complemental apertures 24 in the cover 20 for locating the cover in the proper position with respect to the water container 10.

Suitable hasps (not shown) may be provided for retaining the cover in position with respect to the water container 10.

The cover 20 has secured thereto a funnel 25, with an inverted frusto-conical portion 26 extending above the upper face of the cover 20 and with a cylindrical tube 27 extending below the cover 20. The lower end of the cylindrical tube 27 has removably telescoped thereon a tube 28, and the lower end of this tube 28 is provided with a strainer screen 29 of wire mesh or other suitable material. The strainer screen 29 prevents the introduction of dirt and the like with the cream and also keeps insects from entering the interior. The telescoping tube 28 is removably secured to the tube 27 in any suitable manner so that the structure may be separated for cleaning. A bayonet joint, such as shown in Figs. 1 and 5, with an outwardly extending portion 30 on the tube 27 and a slot 31 in the telescoped tube 28, has been found suitable for this purpose.

The water container 10 is provided with a water inlet pipe 35, which is mounted at the central portion of the bottom wall 12. A baffle 36 is mounted above the delivery end of the pipe 35 and this baffle serves to distribute the cooling water introduced through the water inlet pipe 35 so that some of the water passes outwardly toward the side walls of the water container 10. Other portions of the water delivered by the water inlet pipe 35 pass upwardly through the central portion of the water container 10, as will be hereinafter more fully referred to.

The water container 10 is provided with a water discharge pipe 38, which is preferably spaced a short distance below the upper edge, through which the cooling water after absorbing heat from the cream cooling can 11 and its contents passes out.

The cream cooling receptacle or can 11 is removably mounted within the water container 10 and spaced therefrom. The cream cooling receptacle 11 is preferably a can C-shaped in horizontal cross section as will be seen in Figs. 2 and 3. The cream cooling can 11 includes a bottom wall 40, an outer curved wall 41 which is spaced from the wall 13 of the water container 10, an inner curved wall 42, and curved end walls 43 and 44 which join the inner curved wall 42 with the outer curved wall 41.

The shape of the can provides an interior water circulating space as at 45. The particular spacing provided between these curved walls 41 and 42 has been found in practice to have a very important effect upon the cooling of the separated cream. The distance between the walls 41 and 42 which produces most effective results is two inches. A departure from this two inch spacing changes to a surprising degree the cooling effect obtained. For example, if the spacing between the walls 41 and 42 is more than two and a half inches, the time required for cooling the entire body of cream in the cooling can 11 becomes excessive and souring of the portion in the central part of the space may occur during the time required to effect the cooling. A decrease of the spacing below the two inches does not materially or proportionately increase the rapidity of cooling, adds to the difficulty of construction and likewise makes difficult the cleaning of the interior of the can 11.

The spacing of the curved walls 43 and 44 has also been found to have an important effect upon the cooling of the separated cream. It has been found in practice that a space for passage of the cooling water as at 46, of approximately three inches and not more than about four inches between the walls 43 and 44 produces the most effective results and a more equal distribution of the effect of the cooling water.

The curved walls 43 and 44 are preferably spaced and braced at the upper and lower portions thereof, and a horizontally extending handle 50, with angularly extending attaching portions 51 for riveting, as at 52, to the cooling can 11, has been found most suitable for the upper portion.

Adjacent the lower end of the can 11, another handle 50ª is preferably provided which is similar to the handle 50 and is secured to the cooling can 11 in the same manner.

A modified form of spacing and bracing structure is shown in Fig. 6, and includes a hollow tube 53 soldered or otherwise secured to the curved walls 43 and 44. The interior of the tube 53 is not, however, in communication with the interior of the cream cooling space.

A segmental strip of metal 55 is secured to the upper edge of the curved wall 42 of the cooling can 11 and is oppositely disposed with respect to the handle 50. This segmental strip 55 prevents the passage of water into the interior of the cream cooling can 11, as hereinafter pointed out.

The cooling can 11 is supported in spaced relationship with respect to the bottom 12 of the water container 10, by suitable feet 56 which are rigidly secured, as by rivets 57, to the curved wall 42 and have inturned portions 58 at the lower ends thereof which rest on the bottom plate 12.

The space 46 between the walls 43 and 44 of the cooling can 11 is preferably disposed opposite to the water outlet pipe 38 and the cooling can 11 is also located with respect to the cover 20 so that the tube 28 is close to one of the curved walls 43 or 44.

The cream cooling can is preferably mounted in the water container in a predetermined relationship to the water container and to the cover, and to effect this, suitable guiding and retaining devices are employed.

The cooling can guiding and retaining devices may be of any preferred type but preferably include angular strips of metal 60 mounted on the inside of the curved wall 13 of the water container 10 for engagement with elongated sockets 61 mounted on the exterior of the curved wall 41 of the cooling can 11.

Latch members 63 are provided for retaining the cream can in position while the same is empty and buoyant and mounted on the inner wall of the cooling can 11. The latch members 63 have hooked portions 64 for engagement in apertures 65 in angular pieces 66 mounted on the upper portion of the can wall 41.

The mode of operation of the device will now be pointed out. With the cooling can 11 withdrawn in the water container 10, and positioned as illustrated in Fig. 1, the feet 56 rest on the bottom 12 of the water container 10 and the latches 63 are placed in engagement with the apertures 65 for holding the cooling can 11 in position.

Cooling water is introduced through the water inlet pipe 35, and upon contact with the baffle 36 the direct upward flow is modified so that the cool water flows upwardly on all sides of the cooling can 11. The portion of the cooling water which passes up through the central space 45 passes to the exterior of the cooling can 11 through the space 46 between the curved walls 43 and 44. The cooling water is then discharged from the top portion of the water container 10 through the water discharge pipe 38. The temperature of the cooling water available on the farm for introduction through the water inlet pipe 35 usually runs in the neighborhood of 52° F.

The lid 20 is placed on the water container 10 and is located at the proper position with respect to the water container and the cooling can by means of the positioning of the lugs 23 and the apertures 24. The positioning of the lid brings the tube 28 adjacent one of the curved walls 43 or 44.

The circulation of the cooling water cools the cream can 11 in preparation for receiving the separated warm cream which is introduced through the funnel 25 and passes through the strainer 29 into the cooling can.

The cream upon its introduction comes immediately into contact with the large expanse of cooled wall surface adjacent the curved wall 43 or 44. As additional cream is introduced, it fills the space within the interior walls of the cream cooling receptacle 11 in contact with and proximity to the curved walls 41 and 42 around which the cooling water is in constant circulation.

When the level of the separated cream reaches the screen 29 or rises above the screen, the user will note that the capacity of the cooling can 11 has been reached.

In actual operation, it has been found with a cooling water temperature of approximately 52° F. and with a temperature of the separated cream in excess of 90° F., that the time required for cooling the separated cream to a temperature of or below 56° F. does not exceed approximately eight minutes.

It will be noted that with the rapid cooling thus obtained, the cooling of the cream is substantially completed upon the completion of the separation and before the bacteria has had an opportunity to develop to an appreciable extent and before any souring could possibly occur.

After cooling the cream may be transferred to suitable storage cans (not shown), by unlatching the hooks 63 and raising the cream can 11 from the water container 10 by means of the handle 59. The can may also be gripped with the other hand at the strip 55 for assisting in raising the same. The can may then be tilted, and the cooled cream poured over the edge opposite the handle 50. The strip 55 prevents water from the inside edge of the can from intermingling with the cooled cream during this pouring.

The rapidity with which these operations may be carried out, makes possible the washing of the separator and the cream cooler at the same time, with resultant simplification of the operations of the operator and increased likelihood that proper cleaning of the apparatus will be effected.

We claim:

1. A cream cooling receptacle having an outer curved side wall and an inner curved side wall, said walls being spaced apart a predetermined distance, end walls connecting said side walls, said curved and end walls enclosing a cream receiving space substantially C-shaped in horizontal cross section, means for spacing and bracing said end walls, and a strip of material at the upper inner edge of said inner curved wall for protecting the cream receiving space from water ingress.

2. A cream cooling receptacle having an outer curved side wall and an inner curved side wall spaced therefrom, end walls connecting said side walls, said walls defining a cream receiving space substantially C-shaped in horizontal cross section, a handle secured to said receptacle, and means secured to the upper inner edge of said inner wall and oppositely disposed with respect to said handle for preventing the passage of water into said cream receiving space.

3. A cream cooling receptacle including an outer curved side wall and an inner curved side wall spaced a distance of approximately two inches from said outer wall, the inner curved wall defining a central cooling fluid space, end walls extending between the end portions of said side walls to provide a cooling fluid space in communication with the space within said inner wall, a handle extending across the space between the said end walls, and a segmental lip on the inner edge of the inner wall remote from the space between the said end walls.

4. A cream cooling receptacle including an outer curved wall and an inner curved side wall spaced a distance of approximately two inches from said outer wall, end walls extending between the end portions of said side walls to provide a cooling fluid space in communication with the space within said inner wall, and a segmental lip on the upper inner edge of the inner wall remote from the space between the said end walls.

JOHN W. SADLER.
GROVER A. BLUNT.